US012783827B2

(12) United States Patent
Mateer

(10) Patent No.: US 12,783,827 B2
(45) **Date of Patent: *Nov. 3, 2026**

(54) RETURN LEG REMOTE PASSENGER BAG TAG GENERATION

(71) Applicant: Craig Mateer, Orlando, FL (US)

(72) Inventor: Craig Mateer, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/152,585

(22) PCT Filed: Jan. 26, 2024

(86) PCT No.: PCT/US2024/013226
§ 371 (c)(1),
(2) Date: Jul. 31, 2025

(87) PCT Pub. No.: WO2024/163300
PCT Pub. Date: Aug. 8, 2024

(65) Prior Publication Data

US 2026/0111690 A1 Apr. 23, 2026

Related U.S. Application Data

(63) Continuation-in-part of application No. 18/104,359, filed on Feb. 1, 2023, now Pat. No. 11,682,241, and (Continued)

(51) Int. Cl.
*G06Q 10/02* (2012.01)
*G06K 7/10* (2006.01)
*G06K 7/14* (2006.01)

(52) U.S. Cl.
CPC ....... *G06K 7/10366* (2013.01); *G06K 7/1413* (2013.01)

(58) Field of Classification Search
CPC ....... G06Q 10/025; B64F 1/368; B64F 1/366; G09F 2003/0254; G06K 19/025; G06K 7/10445
(Continued)

(56) References Cited

U.S. PATENT DOCUMENTS 6,158,658 A * 12/2000 Barclay .................. G07B 15/00 235/375
6,707,879 B2 3/2004 McClelland et al.
(Continued)

FOREIGN PATENT DOCUMENTS

CN 111506614 8/2020

OTHER PUBLICATIONS

International Search Report and Written Opinion mailed Jun. 3, 2024 for International PCT Patent Application No. PCT/US24/13226 (9 pages).

*Primary Examiner* — Paultep Savusdiphol
(74) *Attorney, Agent, or Firm* — Fox Rothschild LLP

(57) ABSTRACT

The disclosure presents a method for luggage handling processes for passengers on return travel. The process includes acquiring, by an acquiring device, an originating bag tag identifier (O-BTI) or International Air Transport Association (IATA) license plate associated with a bag tag affixed to a luggage item of the passenger. This O-BIT is used to create a digital BTI data record linked to the travel carrier. The method includes printing, by a printing device, a return leg travel IATA-formatted bag tag for a return flight linked to the originating printed bag tag. Additionally, the method may remotely check in the passenger for the return flight by accessing a B-type message using the digital BTI data record, the B-type message containing a passenger name record (PNR) number.

31 Claims, 9 Drawing Sheets

Related U.S. Application Data a continuation-in-part of application No. 18/311,566, filed on May 3, 2023, now Pat. No. 11,948,404, and a continuation-in-part of application No. 18/201,908, filed on May 25, 2023, now Pat. No. 11,881,057, and a continuation-in-part of application No. 18/332,377, filed on Jun. 9, 2023, now Pat. No. 11,900,732, and a continuation-in-part of application No. 18/406,785, filed on Jan. 8, 2024, now Pat. No. 12,254,719.

(58) Field of Classification Search
USPC .......................................... 235/384, 375, 492
See application file for complete search history.

(56) References Cited

U.S. PATENT DOCUMENTS

| | | | | |
|---|---|---|---|---|
| 7,193,515 | B1 | 3/2007 | Roberts et al. | |
| 9,710,776 | B1 | 7/2017 | Lewandowski | |
| 10,832,391 | B2 | 11/2020 | Perticone et al. | |
| 11,682,241 | B1 | 6/2023 | Mateer | |
| 11,881,057 | B1 * | 1/2024 | Mateer | G06Q 10/025 |
| 2002/0176531 | A1 | 11/2002 | McClelland et al. | |
| 2003/0034387 | A1 | 2/2003 | Knowles et al. | |
| 2003/0233244 | A1 * | 12/2003 | Kumhyr | G06Q 10/02 705/5 |
| 2010/0208289 | A1 | 8/2010 | Mateer | |
| 2011/0231212 | A1 * | 9/2011 | Hurley | G06Q 10/02 705/5 |
| 2013/0341389 | A1 | 12/2013 | Roderique et al. | |
| 2017/0132565 | A1 * | 5/2017 | Beadles | G06K 7/1417 |
| 2020/0387861 | A1 * | 12/2020 | Sanglier | G06Q 10/0833 |
| 2021/0201218 | A1 | 7/2021 | Guiol et al. | |
| 2022/0058762 | A1 * | 2/2022 | Goddard | G06Q 10/0833 |
| 2022/0292273 | A1 * | 9/2022 | Kusy | G06K 7/10445 |
| 2024/0137472 | A1 | 4/2024 | Kair et al. | |
| 2024/0140615 | A1 | 5/2024 | Hance et al. | |

* cited by examiner

For Example:

RETURN LEG REMOTE PASSENGER BAG TAG GENERATION

PRIORITY CLAIM

This application is a U.S. National Phase application of PCT International Application No. PCT/US24/13226, filed Jan. 26, 2024, which claims priority to U.S. patent application Ser. No. 18/104,359, filed Feb. 1, 2023, and entitled "Return Leg Remote Passenger Check-In," now issued as U.S. Pat. No. 11,682,241 on Jun. 20, 2023, the entire contents of which are hereby incorporated by reference herein. This PCT application also claims priority to U.S. patent application Ser. No. 18/406,785, filed Jan. 8, 2024, and entitled "Return Leg Passenger Bag Tag Generation," U.S. patent application Ser. No. 18/332,377, filed Jun. 9, 2023, and entitled "Digital Recreation of Original Bag Tag Identifier," U.S. patent application Ser. No. 18/201,908, filed May 25, 2023, and entitled "Return Leg Remote Passenger Check-In from Bag Tag Identifiers," and U.S. patent application Ser. No. 18/311,566, filed May 3, 2023, and entitled "Multi-Leg Travel Baggage Tracking." The entire disclosure of each of the aforementioned applications is hereby incorporated by reference in their entirety.

BACKGROUND OF THE INVENTION

1. Field of the Invention

The described embodiments relate generally to asset management. Specifically, the described embodiments relate to systems and methods for extracting otherwise discarded data and repurposing it to reduce data entry.

2. Brief Description of the Related Art

Travel carriers generally provide a passenger with the ability to check in luggage packed with a passenger's personal items, with or without a luggage fee. The luggage is often weighed to determine whether additional luggage fees are required. Then, the luggage is tagged by the airline with a printed bag tag. Each travel carrier may have its own format for printing a bag tag at the travel carrier counter. This process consumes human resources of personnel working behind the counter to finalize a check-in of the passenger, print boarding passes, process luggage, and print and attach bag tags. Airline travel carriers have also invested in kiosk machines that allow passengers to print bag tags themselves to free up some time of the counter personnel. This can allow a passenger to print and attach the printed bag tag without using the human resources of the counter personnel.

According to the Federal Aviation Administration, the average number of daily passengers in Fiscal Year 2021 was approximately 1.6 million. In Fiscal Year 2019, the average of daily passengers was approximately 2.9 million. Some of these passengers are traveling on a return leg of a trip. Still further, some of the passengers traveling on a return leg are returning from a cruise or high-volume resort.

There have been many attempts to reduce the cost of baggage handling, and especially the baggage handling, traveler departure, and return flight check-in from high-volume lodging entities. To simplify baggage handling during transport, a passenger is provided the option to select services from a third-party vendor to pick-up the passenger and/or baggage and transport the baggage to the airport when needed. The baggage may be picked up from any location, such as a home, office, hotel, etc., and/or delivered to any location identified by the passenger, without the passenger needing to be present.

Another attempt at baggage handling includes cross-use of employees at lodging entities, such as a hotel. One of the biggest drawbacks of cross-use of employees is that these employees are otherwise unavailable for other tasks that may arise for passengers still enjoying the amenities of the lodging entity. Hiring more employees has become a challenge in recent years due to COVID-19. Moreover, employee costs have risen. In some venues, such as a cruise ship, extra employees to handle additional tasks is not just cost prohibitive but also reduces the revenue of the cruise by trading paying passengers for the cost of a hired employee. The ability to print bag tags and boarding passes takes up space in the cruise ship that can be used for passenger lodging.

Some baggage handling services issue a valet receipt or tag that is placed on the luggage. This process still requires the baggage to receive a printed International Air Transport Association (IATA) bag tag with a bag tag identifier to replace the valet receipt or tag. This process can be cost prohibitive in a competitive lodging enterprise competing for clientele. Overall, the baggage handling services require a passenger to order the service using a website or mobile application, enter various passenger information that may be entered incorrectly, and pay a fee. Passengers can be remotely-checked in to their flights by providing in advance all the necessary flight information of a travel itinerary using the website or mobile application. While the process seems benign, data entry errors can occur which can be very costly coupled with the additional cost of baggage handling and temporary valet tickets.

Most times after a passenger arrives at their destination, the bag tag is removed and discarded to make room for the bag tag on their return leg of travel.

An average ocean liner cruise ship has a capacity of approximately 3,000 passengers. Some larger cruise ships have a capacity of 5,400 passengers. Each passenger that will return home using an airline travel carrier must be checked in for their return flight. The cruise ship personnel will handle the precheck-in process for a return flight as well as the number of luggage bags. However, the process consumes valuable limited human resources available on the cruise ship for disembarkation. There is a need for a system and process to address these challenges that is cost and time efficient, and easy to use by any passenger.

BRIEF SUMMARY OF THE INVENTION

The embodiments relate to a system and method for passenger check-in on return modes of travel using a digitally recreated originating bag tag identifier. In one aspect, a method includes, after completion of a leg of travel of a passenger with a first-mode travel carrier, electronically acquiring, by at least one electronic acquiring device, an originating paper bag tag identifier (OP-BTI) associated with or printed on a printed bag tag from the first-mode travel carrier that is on a first luggage item of a passenger to create digital BTI data linked to the first-mode travel carrier. The method includes extracting, by at least one processor, a passenger bag number from the digital BTI data; and accessing, by the at least one processor, a passenger name record (PNR) from a computer system of the first-mode travel carrier, based on the extracted passenger bag number. The method includes autonomously creating, by the at least one processor, a passenger manifest record from the digital BTI data and the PNR, with data identifying for check-in of a return leg of travel of the passenger with a designated return travel carrier; and repeating the method for a plurality of passengers beginning a stay associated with a lodging entity to autonomously form a manifest file with a conduit for checking in the plurality of passengers with the designated return travel carrier.

In one aspect, a computing system includes at least one processor. The computing system also includes a memory storing instructions that, when executed by the at least one processor, configure to, after completion of a leg of travel of a passenger with a first-mode travel carrier, cause the at least one processor to electronically acquire from at least one electronic acquiring device, an originating paper bag tag identifier (OP-BTI) associated with or printed on a printed bag tag from the first-mode travel carrier that is on a first luggage item of a passenger to create digital BTI data linked to the first-mode travel carrier. The processor is configured to extract a passenger bag number from the digital BTI data; and access a passenger name record (PNR) from a remote computer system of the first-mode travel carrier, based on the extracted passenger bag number. The processor is configured to autonomously create a passenger manifest record from the digital BTI data and the PNR, with data identifying for check-in of a return leg of travel of the passenger with a designated return travel carrier; and repeating these steps for a plurality of passengers beginning a stay associated with a lodging entity to autonomously form a manifest file with a conduit for checking in the plurality of passengers with the designated return travel carrier.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
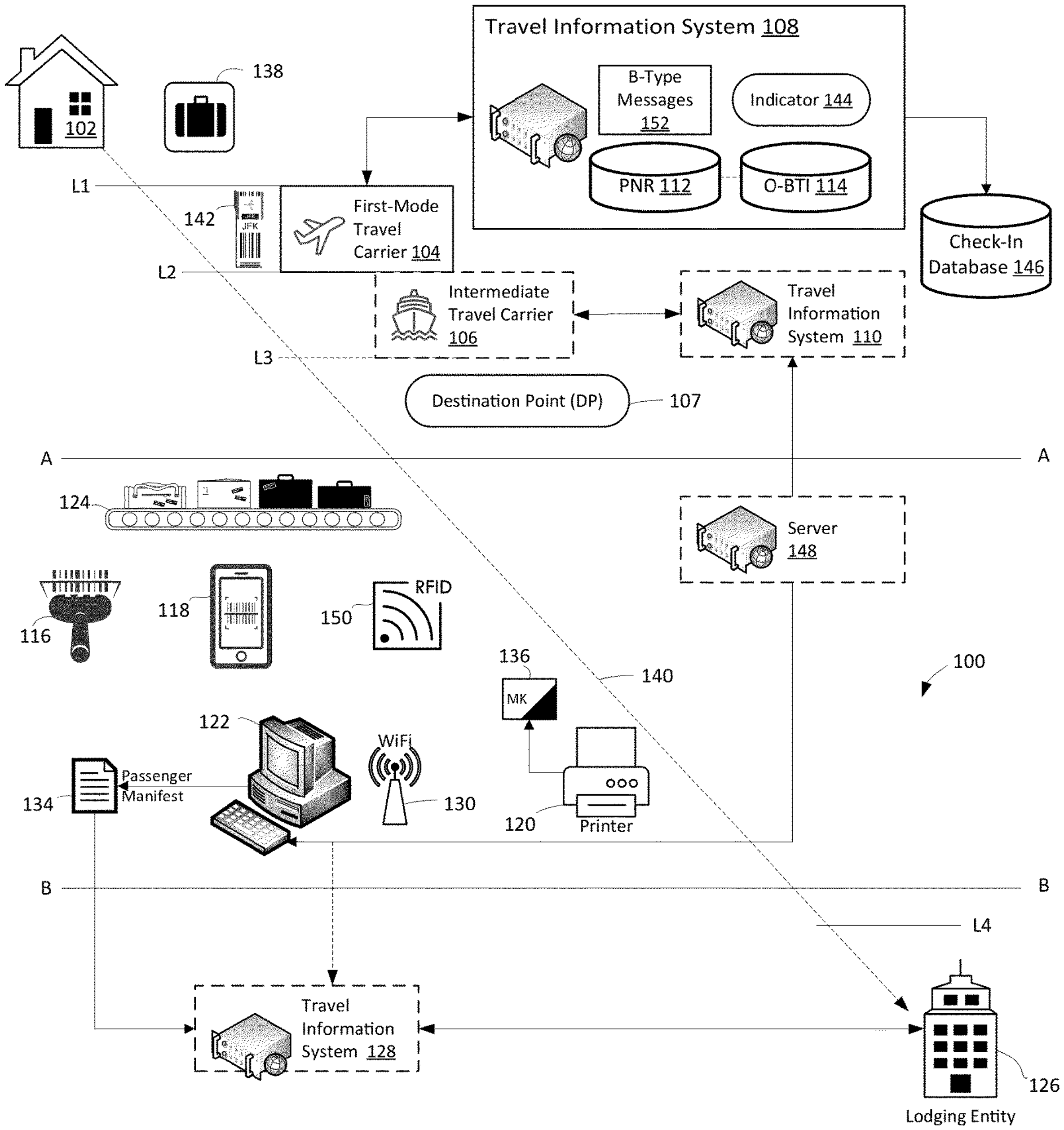
FIG. 1 illustrates a block diagram of a system for checking in a passenger for return legs of travel in accordance with one embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

A Departure Control Systems (DCS) controls various airline operations including airport check-in, generating a passenger bag tag identifier (BTID), and printing of bag tags. The bag tags are formatted based on rules published by the International Air Transport Association (IATA) and include a 10-digit license plate, for example. Typically, one or more IATA Type-B messages are created that includes the 10-digit license plate and flight information.

The inventor has determined that what has been considered garbage (i.e., a discarded airline bag tag) is actually a missing link to cost and time efficient handling of baggage by high-volume lodging entities, such as resorts and cruise lines, by way of a non-limiting example.

Typically, the passenger is encouraged to remove the printed bag tag, after picking up the baggage from the carousel at a destination location. However, the inventor has determined the originally printed bag tag has useful information and instead of discarding the original printed bag tag, it can be used 1) as a substitute for printing and/or attaching temporary valet tags; and 2) for autonomous data entry and retrieval to relieve the passenger or other employee from acquiring a passenger's personal information and return flight information.

A passenger's baggage may be tagged with an adhesive marker from an airline carrier which can also include an IATA license plate bar code. This marker may be placed anywhere on the baggage and can be used as a substitute for printing and/or attaching temporary valet tags or a missing IATA bag tag. For example, an airline IATA bag tag may become damaged or removed as a result of transport though the airline baggage handling system. Thus, the airline baggage marker can be used in the processes described herein.

In some examples, the airline IATA bag tag or other special use bag tags may include a printed IATA license plate and/or a radio frequency identifier (RFID) that can be read by an RFID-reader. However, RFID technology may be used about 10% of the time and is not widely available today. The system and method described herein may use the RFID that is part of the bag tag, for example, and especially if the originally printed bag tag is damaged or otherwise not capable of being scanned by a barcode scanner, by way of a non-limiting example. As is known, the RFID is used because sometimes scanning the 10-digit license plate can be a challenge for the scanners throughout the airline baggage handling system. This is because the printed text may become damaged or the attached bag tag may be in a position that prevents the barcode from being captured. The system herein may use an RFID reader to acquire the 10-digit license plate in parallel with a barcode scanner or if needed.

The inventor has determined that in addition to using the non-discarded original IATA bag tag as a substitute for a valet tag, the IATA bag tag may be used to automate processes so that the processes are less prone to data entry errors, less burdensome on the passenger, save time, and are cost efficient.

The system described herein employs parallel methodologies to acquire passenger identifiable information to accommodate scenarios of damaged or missing IATA bag tags so that the 10-digit license plate can be acquired without a passenger input or input by other employees. For example, all of the passenger information and especially return flight information may be obtained by a process that scans the non-discarded original airline IATA bag tag and autonomously retrieves a passenger record and return flight information for remote check-in of a passenger to return home.

The scanning of all non-discarded bag tags may include scanning dockside of a lodging entity such as a cruise line, scanning at a destination airport or intermediate travel carrier upon arrival, scanning at any lodging entity, such as a hotel resort, and/or scanning at a location anywhere between a destination airport or intermediate travel carrier and the lodging entity.

The inventor has determined that the original printed/paper bag tag by a first-mode of travel carrier has valuable information that can be used to automate processes for checking in a passenger for a return leg of travel with the first-mode of travel carrier and/or develop passenger records for a manifest used by a lodging entity. Instead of removing the original printed bag tag after arrival at a destination point associated with a lodging entity, the code embedded in the license plate on the original printed bag tag can be electronically acquired, digitized, and used to obtain personal information or personally identifiable information (PII) associated with a passenger from the first-mode of travel carrier and subsequently used by the lodging entity or other vendor.

Moreover, the inventor has determined that the license plate on the original printed bag tag can be used to obtain return flight information for the passenger autonomously without the need for the passenger or employees of a lodging entity to manually enter return flight itinerary information.

FIG. 1 illustrates a block diagram of a system 100 for checking in a passenger for return legs of travel in accordance with one embodiment. The system 100 is denoted between lines A-A and B-B. The system 100 may communicate with the travel information system 108 of a first-mode travel carrier 104, the travel information system 110 of an optional intermediate travel carrier 106 and/or the travel information system 128 of a lodging entity 126. In the embodiments described herein, the lodging entity 126 is a cruise ship. The travel information systems 108, 110 and 128 may include web-based servers connected to the Internet, for example. One or more components of the system 100 are located local to a destination point (DP) 107 where the destination point 107 is also local to a lodging entity. In some embodiments, the lodging entity 126 may be a resort destination.

The first-mode travel carrier 104 may be one of an airline carrier, a bus carrier, and a train carrier. However, for the purposes of discussion, the examples will be described in relation to the first-mode travel carrier 104 being an airline carrier. The optional intermediate travel carrier 106 may be one of an airline carrier, a bus carrier, and a train carrier.

The travel journey 140, represented as a dashed line, denotes a path of travel legs L1, L2, and L3 of the passenger and passenger luggage 138 from the point of origin (i.e., home 102) to the point of lodging with or embarkation at the lodging entity 126. Leg L1 is a travel path journeyed from home 102 to a first-mode travel carrier 104. Leg L2 is a travel path journeyed using the first-mode travel carrier 104 to the destination point 107 or to optional leg L3 associated with an intermediate travel carrier 106. Optional leg L3 is a travel path journeyed using the intermediate travel carrier 106 to the destination point 107. For example, a passenger may end its travel path at the end of leg L2 and board a vehicle of a different travel carrier or flight to begin travel along leg L3 to the destination point 107. Still further, it should be recognized that the travel path of leg L3 may include one or more intermediate travel carriers. In some instances, the passenger's journey may have zero (0) intermediate travel carriers, such as in the case of a direct flight or direct travel journey to the destination point 107 along the path of the travel journey 140.

The destination point 107 is local to the port of embarkation of the lodging entity 126. The system 100 or one or more components of the system 100 may be controlled and manned by a third-party service provider independent from any travel carriers. The system 100 may be controlled and manned by a travel carrier local to the destination point 107. The travel carrier local to the destination point 107 may be an airline carrier, a train carrier, a bus carrier, a cruise ship carrier, or a combination thereof.

In some instances, the traveled paths by the first-mode travel carrier 104 and the travel path of the optional intermediate travel carrier 106 may be reversed, such that the travel path journeyed by the passenger on leg L2 may be by an intermediate travel carrier 106 and the travel path journeyed by the passenger on leg L3 to the destination point 107 may be using the first-mode travel carrier 104.

A component of system 100 may include a scanner 116 for scanning a bag tag (BT) 142. An example BT 142 from an airline carrier will be described in more detail in relation to FIG. 2A. The BT 142 is an original paper bag tag (OP-BT) with an original bag tag identifier (O-BTI) 114, such as from a first-mode travel carrier 104 of a first leg of travel. The O-BTI 114 may be stored in a database by first-mode travel carrier 104.

In some embodiments, the components of the system 100 may also include a radio-frequency identification (RFID) reader or a near field communication (NFC) identification reader, both of which are referenced to herein as an RFID-R 150, denoted in a dashed box to denote that it is optional. The RFID reader receives electromagnetic fields to automatically identify and track tags. In some instances, the passenger luggage 138 may use an RFID tag or near field communication (NFC) compatible tags that produce a 10-digit license plate or equivalent identifier. However, currently most luggage still uses the printed or paper bag tag as the primary means of identifying a passenger's piece of luggage 138.

The term passenger luggage 138 may include one or more luggage items. The one or more luggage items may include a first luggage item. In some instances, only the BT 142 of the first luggage item may need to be scanned to digitally recreate a passenger's bag number.

The stored digital O-BTI 114 may be converted to a format compatible with the International Air Transport Association (IATA) bag tags code and other standardized formatting of the carrier. For example, an airline bag tag may include an IATA code that includes a three-character alpha numerical geocode designating airports and metropolitan areas. The IATA code is also known as an IATA location identifier. The IATA also publishes industry standard rules for the creation of bag tags for the airline industry. The printed BT 142 may include a 10-digit license plate and corresponding bar code shown in FIG. 2A. The O-BTI 114 may include information to create the IATA geocode, the original airline flight information, the 10-digit license plate, and other BT information printed on a BT 142, as will be described in FIG. 2A. The BT 142 may use a license plate used for other travel carriers.

A component of the system 100 may include an imaging device 118 for capturing an image of the passenger luggage 138. The components of the system 100 may include an optional printing device 120 that is configured to print on a substrate a marker (MK) 136. The components of the system 100 may include a computing device 122, as will be described in more detail in relation to FIG. 7. The computing device 122 may be in communication with the scanner 116, the imaging device 118, and the printing device 120 via wireless communication, denoted by reference numeral 130. In some embodiments, the computing device 122 may communicate with the scanner 116, the imaging device 118, and/or the printing device 120 using wired communication protocols. The printing device 120 may be a laser printer, inkjet printer, or other printer device.

It should be understood from this disclosure that the system herein accommodates for many possible outcomes that can be experienced by various passengers. The need for a MK 136 is because some baggage that arrives at a destination may not include the originally printed bag tag or the airline's marker, both of which may include an IATA bar code. In such a situation, the system would need to prepare a marker to temporarily tag the baggage.

The system may obtain passenger information by scanning a barcode or quick-response (QR) code associated with a boarding pass of the original flight. In some instances, the passenger's ticket may include information associated with the 10-digit license plate which may be retrieved from the passenger and placed on the baggage without the need to print a MK 136. For example, the passenger may receive a marker with an adhesive backing from an airline attendant at the time of checking in their baggage at the airport.

This marker may include the 10-digit license plate or other information. This marker can be used to identify the baggage by the passenger in the event of lost baggage, for example.

The system may include creating, by a printing device in communication with the at least one processor, a MK 136 with a marker identifier linking the passenger manifest record to the first luggage item when the originating paper bag tag identifier (OP-BTI) associated with or on the printed bag tag of first luggage item is one of damaged or missing; and populating the passenger manifest record with the marker identifier. The marker identifier may be a barcode, readable by a barcode scanning device, where the marker identifier includes one of OP-BTI or a new passenger tracking identifier.

The computing device 122 may communicate with the scanner 116, imaging device 118, and/or printing device 120 using near-field communications (NFC) protocols such as without limitations, BLUETOOTH. The computing device 122 may communicate with the scanner 116, imaging device 118, and/or printing device 120 using wireless fidelity (WI-FI) communications based on Institute of Electrical and Electronic Engineers (IEEE) 802.11 standards. The computing device 122 may communicate with the scanner 116, imaging device 118, and/or printing device 120 using ZIGBEE wireless technology compatible with IEEE 802.15, for example. The computing device 122 may communicate with the scanner 116, imaging device 118, and/or printing device 120 using long range communication protocols, short range communications protocols, cellular radio frequency protocols, or other mobile radio frequency protocols.

In other embodiments, the scanner 116 may be a software application stored on the computing device 122 and programmed to interact with a video device or camera device incorporated into, integrated into, or connected via a cable to the computing device 122. In an embodiment, the computing device 122, imaging device 118, and scanner 116 may be a single device, such as a smart phone, tablet, or other handheld computing device that is video-enabled, herein after referred to as a "smart communication device." In some embodiments, the system 100 may include a local computing device or a server 148 to communicate with the smart communication device(s) and travel information systems 108, 110, and/or 128. The local computing device (i.e., server 148) communicates using wired or wireless communications with at least one smart communication device and/or to the travel information systems 108, 110, or 128.

In an embodiment, the computing device 122, imaging device 118, scanner 116, and RFID-R 150 may be a single device, such as a smart phone, tablet, or other handheld computing device that is video-enabled, also herein after referred to as a "smart communication device."

The imaging device 118, scanner 116, and/or RFID-R 150 may be electronic devices that acquire the barcode or other information associated with the IATA license plate, such as the 10-digit license plate. As should be understood from this disclosure, while the IATA standards use a 10-digit license plate, other license plate formats may be used with more or less digits.

A component of the system 100 may include an optional luggage receiver 124 to transport received luggage, such as on a conveyor belt. While the passenger luggage 138 moves on the conveyor belt, at least one scanner 116 and at least one imaging device 118 may scan or image the information representative of the O-BTI 114. In some embodiments, the imaging device 118 may capture images of one or more passenger luggage 138. Additionally, the RFID-R 150 may also read an RFID tag or NFC tag placed on the luggage receiver 124. In some embodiments, the scanner 116 may scan a QR code-enabled bag tag. The RFID, NFC, and QR code-enabled bag tags may include certain personally identifiable information (PU). This personally identifiable information of the passenger and the information in the passenger name record (PNR) 112 may be used to validate the personal information. The RFID tag or NFC tag should be compatible with IATA RP 1740*c*, for example.

In other embodiments, the luggage receiver 124 may include a designated pad or surface for the placement of a single passenger luggage 138 with a scanner, imaging device 118, and/or RFID-R 150 in proximity to the pad to scan the O-BTI 114 and/or capture images of a passenger luggage 138. The scanner 116 and imaging device 118 may be the same device but operated to look for and scan a barcode with the O-BTI 114 in one process and in a second optional process, find a portion or a side of the body of the passenger luggage 138 to capture identifying luggage features. In some embodiments, the scanned O-BTI data receiver 402 may be bypassed in the event a printed BT 142 is not readable. In this instance, a user may directly enter the 10-digit license plate 210 which is then entered into the license plate parser 404 to identify the travel carrier identification and the passenger's bag number. The scanner 116, imaging device 118, and RFID-R 150 may be integrated into the same device, where the RFID-R 150 will read the RFID tag or NFC tag if a printed bag tag is not present to develop personal information for a manifest.

In a process to capture identifying luggage features, such as using computer vision, a determination may be made that the passenger luggage 138 does not include an original paper bag tag. In this instance, received information from the RFID-R 150 may be used. In some instances, the passenger luggage 138 may have both an RFID tag or NFC tag and an original paper bag tag, as the original paper bag tag may include information associated with a travel carrier for a return leg local to home 102.

The computing device 122 and/or server 148 of the system 100 generates a communication session with a travel information system 108 or 110 to access the PNR 112 based on the scanned BT 142 to obtain information representative of the original O-BTI 114 with an embedded code of a passenger's bag number, as will be described later. The travel information system 108 or 110 will generate a communication with passenger file data 132 that includes the return leg information of the passenger and personal information (PII). The received passenger file data 132 is assembled into a manifest file 134 or sent to the travel information system 128 where a manifest file 134 is created. In some instances, the server 148 may create a manifest file 134. One of the computing device 122 and/or server 148 may communicate a manifest file 134 to travel information system 128 of the lodging entity 126.

The computing device 122 and/or server 148 will merge all the passenger file data 132 into a single manifest file 134 of checked-in passengers. The computing device 122 and/or server 148 will then communicate a manifest file 134 to a travel information system 128 for a lodging entity 126.

Departure Control Systems (DCS) may control the management of the check-in process for an airline travel carrier. The travel information system 108 or 110 may include a check-in indicator 144 that indicates that a passenger is checked-in for travel within a particular window. In some embodiments, the travel carrier may include a check-in database 146 for those passengers that have been checked in for travel.

Figure 2A:
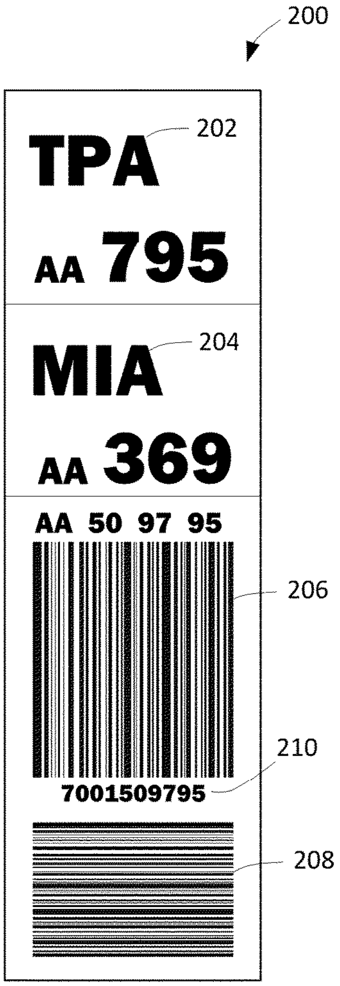
FIG. 2A illustrates a partial view of a conventional airline bag tag of the prior art.

An example scenario will now be described in detail. A passenger ready for a travel journey begins at home 102 where the passenger luggage 138 originates, for example, and travels on leg L1 of travel journey 140. The passenger luggage 138 may travel with the passenger or via a luggage transport service to a first-mode travel carrier 104, which begins leg L2 of travel. Assume the first-mode travel carrier 104 is an airline. At the first-mode travel carrier 104, the passenger luggage 138 receives a BT 142, as shown in FIG. 2A. The BT 142 includes printed information representative of the O-BTI 114 compatible with the International Air Transport Association (IATA) bag tag format. ABT 142 may be printed on paper or paper composite at the airline counter via an airline agent, a luggage transport service, or by the passenger at a kiosk. The BT 142 remains on the passenger luggage 138, as it travels on leg L3 of travel, if used, as described later.

The passenger's travel journey 140 will include a lodging entity 126. In this example, assume the lodging entity 126 is a cruise ship. In some embodiments, prior to the passenger embarking on a cruise (i.e., lodging entity 126), the BT 142 with the O-BTI 114 is scanned by scanner 116 to digitize the printed representation of O-BTI 114.

In various scenarios, the passenger's travel journey 140 may include leg L2 of travel and leg L3 of travel. For example, if there is only a first-mode travel carrier 104 then leg L3 of travel is omitted. In this instance, the first-mode travel carrier 104 may provide a direct flight to a city or destination in proximity or local to the lodging entity 126. In other examples, a passenger's travel journey 140 may include an intermediate travel carrier 106 to provide for a leg L3 of travel. For example, a passenger's travel journey 140 may include at least one connecting flight or leg of travel to a city or destination in proximity to the lodging entity 126. The connecting leg of travel may be denoted as leg L3 of travel, which begins at the end of leg L2 and ends at a destination point 107.

FIG. 2A illustrates a partial view of a conventional airline bag tag 200 (i.e., BT 142) of the prior art that is printed. The bag tag 200 is half of a bag tag. The bag tag 200 includes two sides, which may be mirror images of each other so that ends of the bag tag 200 may be affixed together. In the example illustrated, the bag tag 200 includes an origination airport flight identifier 202, represented as three digits and a destination airport flight identifier 204, represented as three digits. The bag tag 200 includes at least one barcode flight identifier 206. In this illustration, the bag tag 200 includes a first barcode flight identifier 206 having the bars of the barcode oriented in a first orientation and a second barcode flight identifier 208 having the bars of the barcode oriented in a second orientation, different from the first orientation. The format of the bag tag may have slight changes from country to country and travel carrier to travel carrier.

The bag tag 200 includes a 10-digit license plate 210 that is a compatible with the IATA rules. The 10-digit license plate number includes a first integer in the range of 0-9 followed by a three-digit airline code followed by six digits of the license plate number. The last six digits of the license plate number correspond to a passenger bag number. The font of the digits can be hard to capture. The 10-digit license plate 210 includes is adjacent to first barcode flight identifier 206 and/or second barcode flight identifier 208.

The human-readable license plate 210 will have either a two-character or a three-digit IATA carrier code. For example, it may be either "AA509795" or "001509795." "AA" would be the two-character IATA code for American Airlines, and "001" would be the three-digit IATA carrier code. Nevertheless, the barcode will always be the full ten digits.

The first barcode flight identifier 206 is a label that hides personal information and flight information. For example, the first barcode flight identifier 206 is coded to include the passenger's name and information about where the luggage should go (i.e., the destination), and other information, such as the name of the airport of arrival, the departure time, an IATA airport code of airport of arrival, an airline code and flight number, and the name of the passenger identified with the baggage (e.g., in a last name, first name format). The first barcode flight identifier 206 is a modified version of the license plate 210.

The bag tag number includes a two-letter airline code and six digits. The six digits represent the passenger's bag number. By using the passenger's bag number, a PNR 112 may be found. In some embodiments, the passenger's bag number also hides personal information of passenger.

The airline carriers generate and store one or more B-Type messages 152. The B-Type messages 152 may include one or more of a baggage transfer message (BTM), baggage source message (BSM), baggage processed message (BPM), baggage unload message (BUM), baggage not seen message (BNS), baggage control message (BCM), baggage manifest message (BMM) and baggage request (BRQ). The bag tag number is part of the baggage messages.

The license plate 210 embedded in either the first barcode flight identifier 206 or the second barcode flight identifier 208 is known as an index number (IN) linking to a Baggage Source Message (BSM), sent by a carrier's departure control system (DCS), to the airport's baggage handling system where each digit in the license plate 210 has a specific meaning. For example, the BSM contains flight details and passenger information from the second leg L2.

The inventor has determined that the index number (IN) embedded in the license plate 210, first barcode flight identifier 206, or second barcode flight identifier 208 may be used to access the PNR 112 of a passenger.

The example in FIG. 2A is a self-tag airline bag tag 200 printed by a passenger via a kiosk at an airport. All bag tags of an airline will include the same license plate format.

Figure 2B:
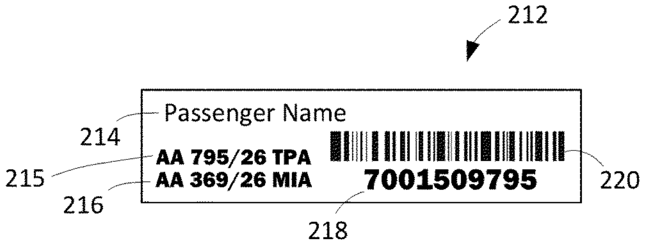
FIG. 2B illustrates a conventional airline bag tag marker of the prior art.
Figure 2C:
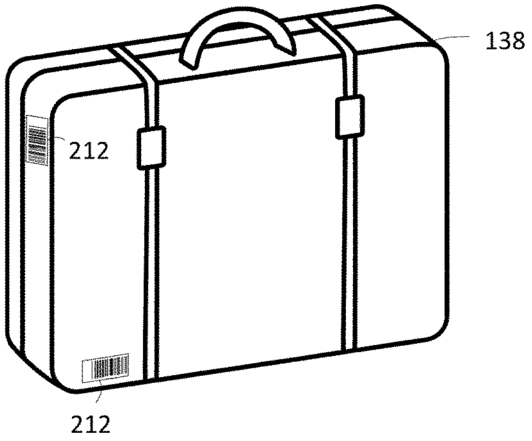
FIG. 2C illustrates an example of affixing bag tag markers to passenger baggage.

FIG. 2B illustrates a conventional airline bag tag marker 212 of the prior art. The airline bag tag marker 212 may include the passenger name, origination airport flight identifier 214, destination airport flight identifier 216, a 10-digit license plate 218, and adjacent barcode flight identifier 220.

In some embodiments, the airline tag marker 212 is affixed to an end of the conventional airline bag tag 200 and can be detached for the passenger to keep. The airline bag tag marker 212 is also printed on paper or a paper composite.

The MK 136 printed by printing device 120 may include personal information for the PNR 112 to populate the passenger's name. In some instances, MK 136 may include a temporary bag tag with an embedded code for the lodging entity 126 or for a return leg.

Figure 3:
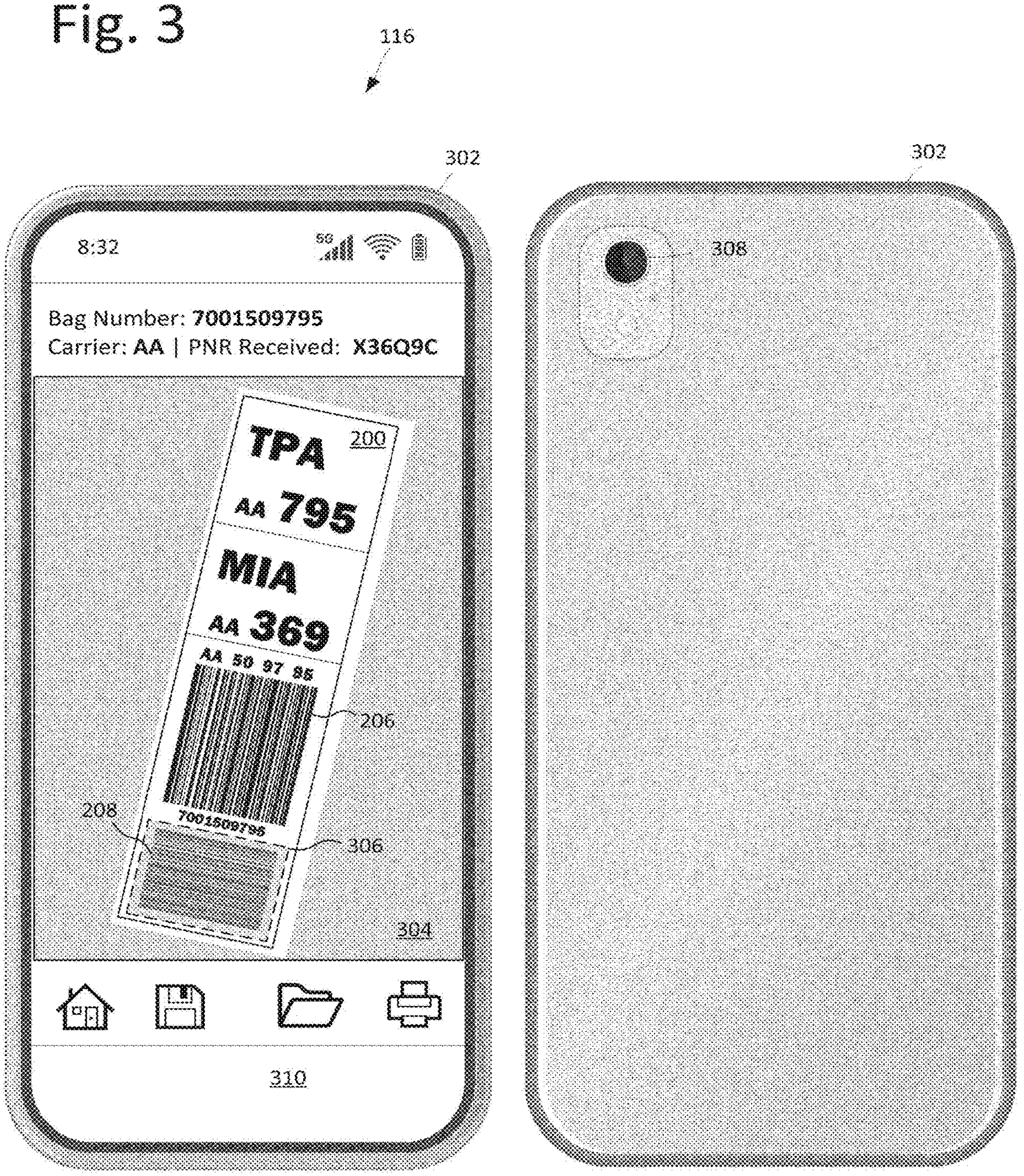
FIG. 3 illustrates a scanner in accordance with one embodiment.

FIG. 3 illustrates a scanner 116 in accordance with one embodiment. The scanner 116 includes a software application (i.e., scanner application 310) loaded on a computing device 302, such as computing device 122. The user of the scanner 116 will direct the camera lens 308, in the direction of the printed bag tag 200. The camera lens 308 is on a rear-side of the device that is opposite the side with the display screen 304. The processor of the computing device 302 causes an image (input) representative of the printed bag tag 200 captured by camera lens 308 to be displayed on the display screen 304.

The scanner application 310 may provide a barcode window 306, denoted in dashed lines, to highlight and identify in the image the printed barcode or for directing the user in the direction of the barcode so that the window 306 is placed to capture all of the bars of the second barcode flight identifier 208, for example. The scanner application 310 may alternately, or in addition, scan the first barcode flight identifier 206. The window 306 may be automatically displayed with the initiating of the scanner application 310. The scanner application 310 may search for a linear or one-dimensional (1D) barcode, for example, to convert the barcode of the first barcode flight identifier 206 or the second barcode flight identifier 208 and produce a series of digits representative of the license plate 210, for example. A person can see the license plate 210. However, entering each digit can be time consuming and susceptible to human error.

The first barcode flight identifier 206 or the second barcode flight identifier 208 associated with the license plate 210 can be used as an index number (IN) linking to the Baggage Source Message (BSM), for example, with passenger information, to locate and access the PNR 112 for the passenger and their return flight information.

In some embodiments, the scanner application may also be used to capture a QR code bag tag identifier on a QR code bag tag, affixed to the passenger luggage 138. This information may be used to validate the PNR 112 or to access personal information.

Figure 4:
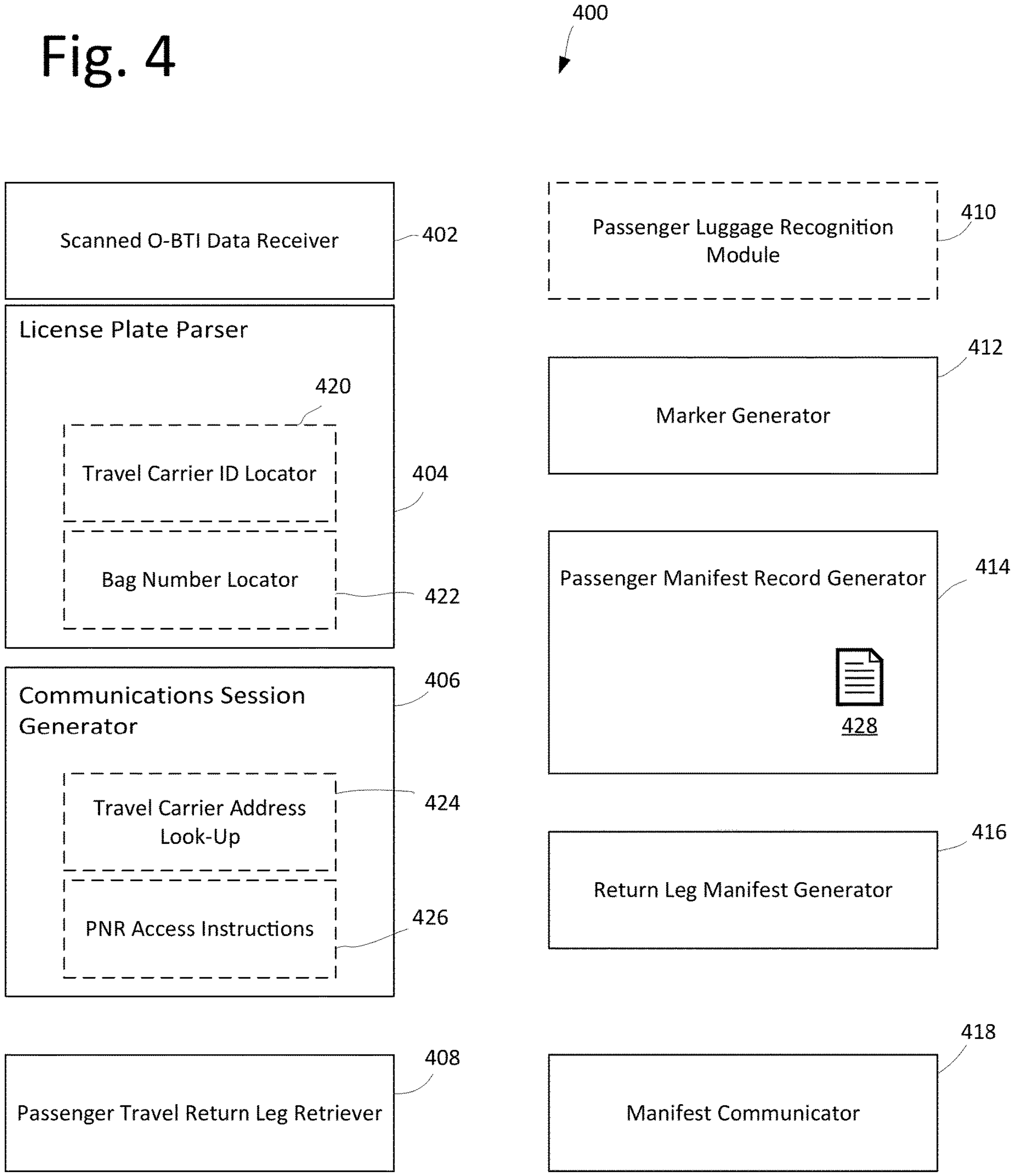
FIG. 4 illustrates a block diagram of programming modules for checking in a passenger and generating a manifest for embarking on a leg of travel in accordance with one embodiment.

FIG. 4 illustrates a block diagram of programming modules 400 for checking in a passenger and generating a manifest for embarking on a leg of travel in accordance with one embodiment. The programming modules 400 may be on the computing device 122, the server 148, or a combination thereof.

The one or more programming modules 400 may include software, hardware, firmware, or a combination of software, hardware, and firmware. The computing device 122 and/or server 148 may include at least one processor and/or hardware to execute instructions of the programming modules 400.

The programming modules 400 may include a scanned O-BTI data receiver 402 and a license plate parser 404. The scanned O-BTI data receiver 402 may receive 10 digits embedded in the captured barcode of the first barcode flight identifier 206 or the second barcode flight identifier 208 and parse, by the license plate parser 404, the series of digits received from the scanner application 310. The license plate parser 404 may track the digits to locate the travel carrier identification (ID) by the travel carrier ID locator 420. The license plate parser 404 may track the digits, such as the last six digits, to locate the bag number by the bag number locator 422.

The license plate parser 404 may extract the first digit of the converted barcode. In this instance, it is the number 7. This digit may be discarded. Then, the license plate parser 404 may extract the next three digits, by the travel carrier ID locator 420. In this case the next three digits include "001," which correspond to the travel carrier ID. In this case, the travel carrier ID corresponds to American Airlines. The license plate parser 404 may then extract the next six digits, which include "509795" using the bag number locator 422. These six digits correspond to the bag number for the passenger.

In some embodiments, the scanned O-BTI data receiver 402 may be bypassed in the event a printed BT 142 is not readable. In this instance, a user may directly enter the 10-digit license plate 210 which is then received by the license plate parser 404 to identify the travel carrier identification and the passenger's bag number.

The programming modules 400 may include a communications session generator 406 to communicate with at least one of the first-mode travel carrier 104 and/or the intermediate travel carrier 106. The communications session generator 406 may include a travel carrier Internet Protocol (IP) address look-up database 424 and PNR access instructions 426. The travel carrier ID of the license plate 210 may be used to locate the predetermined instructions to generate an electronic communication packet to a server of the first-mode travel carrier 104 and/or the intermediate travel carrier 106 associated with the travel carrier ID. The communications session generator 406 would also extract stored instructions for accessing the return leg information from the stored PNR access instructions 426 using a digitally created passenger's bag number extracted from the first barcode flight identifier 206 or the second barcode flight identifier 208 associated with the license plate 210. The communication instructions may identify the information associated with tools (i.e., programming instructions) compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

In some embodiments, instructions may identify a link of the scanned license plate 210 to the Baggage Source Message (BSM) with passenger information, to locate and access the PNR 112 for the passenger and their return flight information. The link may be, without limitation, a HTTP compatible link, in some embodiments.

During the communications session, the computing device 122 may execute programming instructions of a passenger travel return leg retriever 408, where the return leg is a traveled path or portion of a journeyed path to return home 102. For example, if the passenger is returning home 102 using the same travel carrier as the original printed bag tag, the PNR 112 would include the return flight information. Otherwise, the return flight information may be marked as null by system 100.

The programming modules 400 may include a passenger luggage recognition module 410. The image data of the imaging device 118 may be processed by machine learning software to generate an image of the passenger luggage 138. This image may be stored in a database for a passenger luggage recognition process. In some instances, a passenger's luggage may need to be found or identified. The computing device 122 or server 148 may store an image of the passenger luggage 138 that can be later retrieved. Machine learning algorithms may then be used to recognize luggage and match a passenger with their luggage.

The computing device 122 or server 148 may use machine learning algorithms to identify whether a particular luggage item has been processed by one or more components of the system 100.

The programming modules 400 may include a marker generator 412. The marker generator 412 may generate a barcode for use in the format of the MK 136 that can be printed by printing device 120 and affixed on the passenger luggage 138. As discussed previously, the MK 136 may be used when the original bag tag or airline marker are not available or unscannable, such as due to damage.

The programming modules 400 may include a passenger manifest record generator 414, a return leg manifest generator 416, and manifest communicator 418. The passenger manifest created from the non-discarded originally printed bag tag may be used to reconcile passengers arriving at a lodging entity 126 and determine room or cabin numbers. The non-discarded printed bag tag populated in the manifest is used to bring a passenger's baggage to their room and/or lodging entity 126, for example, without the need for generating a temporary valet tag. The non-discarded printed bag tag may be used also for departures of the passengers from the lodging entity 126 to return home 102 for example, without the need to print yet another temporary valet tag.

The passenger manifest record generator 414 may store, in one or more files, passenger information 428 and related PNR 112 for those passengers with passenger luggage 138 scanned by system 100. The passenger information 428 may include the first name, middle name or initial, last name, and contact information of the passenger. For example, the contact information may also include the passenger's address. The passenger information 428 may include private information (PII).

The components of system 100 may store a list of passengers for one or more lodging entities 126 local to the destination point 107 so that passenger luggage 138 for passengers not intended to travel via the lodging entity 126 will not be commingled with passenger luggage 138 for lodging entity 126. In some embodiments, the files of passenger information 428 may include passenger information associated with a pre-paid service with a third-party service provider, the first-mode travel carrier 104, or the lodging entity 126. In some embodiments, the files of passenger information 428 may include assigned cabin numbers for the passenger. Thus, the marker generator 412 may communicate with the passenger manifest record generator 414 to obtain information, such as a cabin number and a passenger name, to format and populate a field of the marker printed by the marker generator 412.

The return leg manifest generator 416 may extract information of the PNR 112 that includes return leg travel information, including, without limitation, the travel carrier of the return leg mode of travel, the departure time of the return leg mode of travel, a flight number, and/or an estimated number of luggage bags that need to be checked in for the return leg home. The return leg manifest generator 416 may populate return leg travel information into corresponding data fields of the manifest file 134.

The manifest file 134 includes a conduit for checking in the plurality of passengers with the designated return travel carrier. The conduit may include a graphical user interface to remotely check-in each passenger leaving the lodging entity 126 within a designated window prior to a return flight. In some embodiments, the passenger manifest record includes the digital BTI data, the PNR 112, and data used for identifying a check-in of a return leg of travel of the passenger with a designated return travel carrier.

The manifest communicator 418 is configured to establish a communication session with the travel information system 128 associated with the lodging entity 126. The manifest communicator 418 may have different instructions for each travel information system 128 of a plurality of cruise ship carriers. The communication instructions may identify the information associated with tools (i.e., programming instructions) compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

Figure 5:
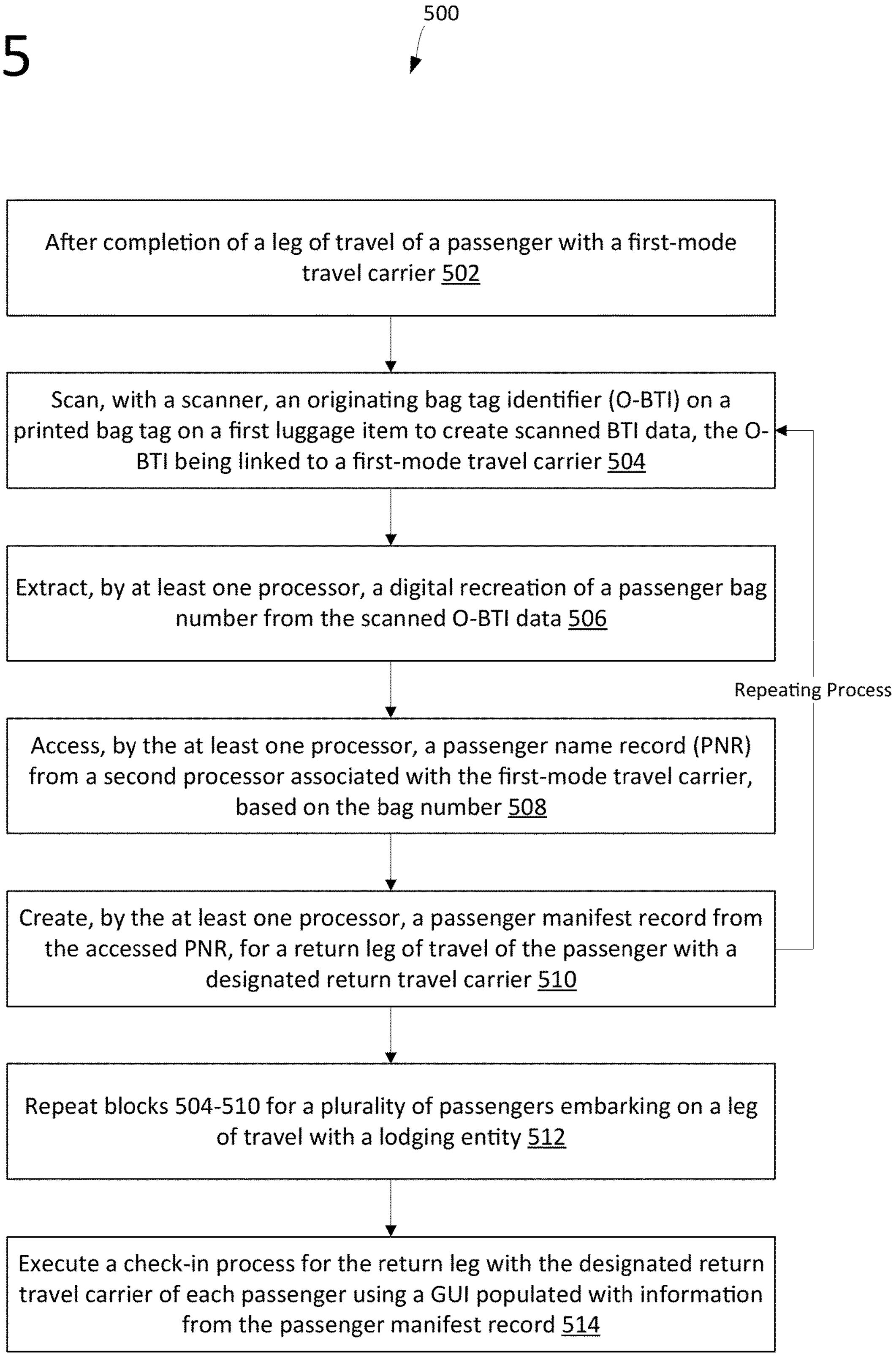
FIG. 5 illustrates a method for checking in a passenger in accordance with one embodiment.

FIG. 5 illustrates a method 500 for checking in a passenger in accordance with one embodiment. The method 500 creates a digital license plate number from a printed BT for use in obtaining return flight information, for example. In block 502, method 500 begins after completion of a leg of travel of a passenger with a first-mode travel carrier. In block 504, the method 500 includes acquiring an originating bag tag identifier, such as the 10-digit license plate, for example. The process of acquiring the originating bag tag identifier may include scanning, with a scanner, an originating bag tag identifier (O-BTI) on a printed bag tag of a first luggage item to create scanned or digital BTI data, with the printed O-BTI being linked to a first-mode travel carrier. By way of non-limiting example, the scanner may be a barcode scanner.

In some instances, the acquiring of the originating bag tag identifier may include receiving an RFID signal including information representative of the originating bag tag identifier. In other embodiments, acquiring the 10-digit license plate may include scanning an airline marker with adhesive backing which may be on the baggage. In some cases, the airline marker with adhesive backing is part of the original boarding pass received from the airline attendant at the time of check-in for an original flight.

In summary, assume that the first-mode travel carrier is an airline carrier. Then the electronic acquiring, by at least one electronic acquiring device, may include at least one of: i) scanning, by a barcode scanner, the originating paper bag tag identifier (OP-BTI) on a printed paper bag tag from the airline carrier that is attached to the first luggage item of the passenger; ii) scanning, by the barcode scanner, the OP-BTI on a printed marker from the airline that is attached to the first luggage item; and iii) reading, by a radio frequency identifier (RFID) reader, RFID information associated with the OP-BTI.

In block 506, the method 500 may include extracting, by at least one processor, a passenger bag number from the scanned O-BTI data. The block 506 may include extracting a travel carrier code from the scanned or digital BTI data.

In block 508, the method 500 may include accessing, by the at least one processor, a passenger name record (PNR) from a second processor associated with the first-mode travel carrier, based on the digitally created passenger bag number or the digitally created 10-digit license plate. In block 510, the method 500 may include autonomously creating, by the at least one processor, a passenger manifest record from the accessed PNR 112, for a return leg of travel of the passenger with a designated return travel carrier. The passenger manifest record may include the digital BTI data and the PNR, with data used for identifying a check-in of a return leg of travel of the passenger with a designated return travel carrier. The passenger manifest record may be populated with travel carrier codes embedded in scanned O-BTI or the accessed PNR 112. The passenger manifest record may be associated with digital BTI data linked to the passenger for tracking and handling of the luggage items of the passenger before and after the passenger's stay with a high-volume lodging entity. For example, a high-volume lodging entity may be located on a Disney™ property or other resort destination with lodging accommodations.

In block 512, the method 500 includes repeating blocks 504-510 for a plurality of passengers embarking on a leg of travel with a lodging entity. In block 514, the method 500 may include executing a check-in process for the return leg with the designated return travel carrier of each passenger using a graphical user interface (GUI) populated with information from the passenger manifest record. The repeating blocks 504-510 may be for a plurality of passengers beginning a stay associated with a lodging entity to autonomously form a manifest file with a conduit for checking in the plurality of passengers with the designated return travel carrier.

In some embodiments, the method 500 may include populating, by the at least one processor, a manifest file with each created passenger manifest record for the lodging entity.

Block 508 of the method 500 may include identifying a travel carrier from the scanned O-BTI data and identifying stored communication session procedures to communicate with the travel carrier based on the scanned or digital O-BTI data. The stored communication session procedures may identify a communication protocol for accessing, by the at least one processor, a passenger name record (PNR) from a remote second processor (i.e., the travel information system 108 or 110) associated with the travel carrier over a communication network.

The communication format may include tools compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

The process for executing the check-in process of block 514, for the return leg with the designated return travel carrier, may also use stored communication instructions to control a remote second processor to check in a passenger for the passenger's return leg of travel back home, for example, within a predetermined check-in window.

Figure 6:
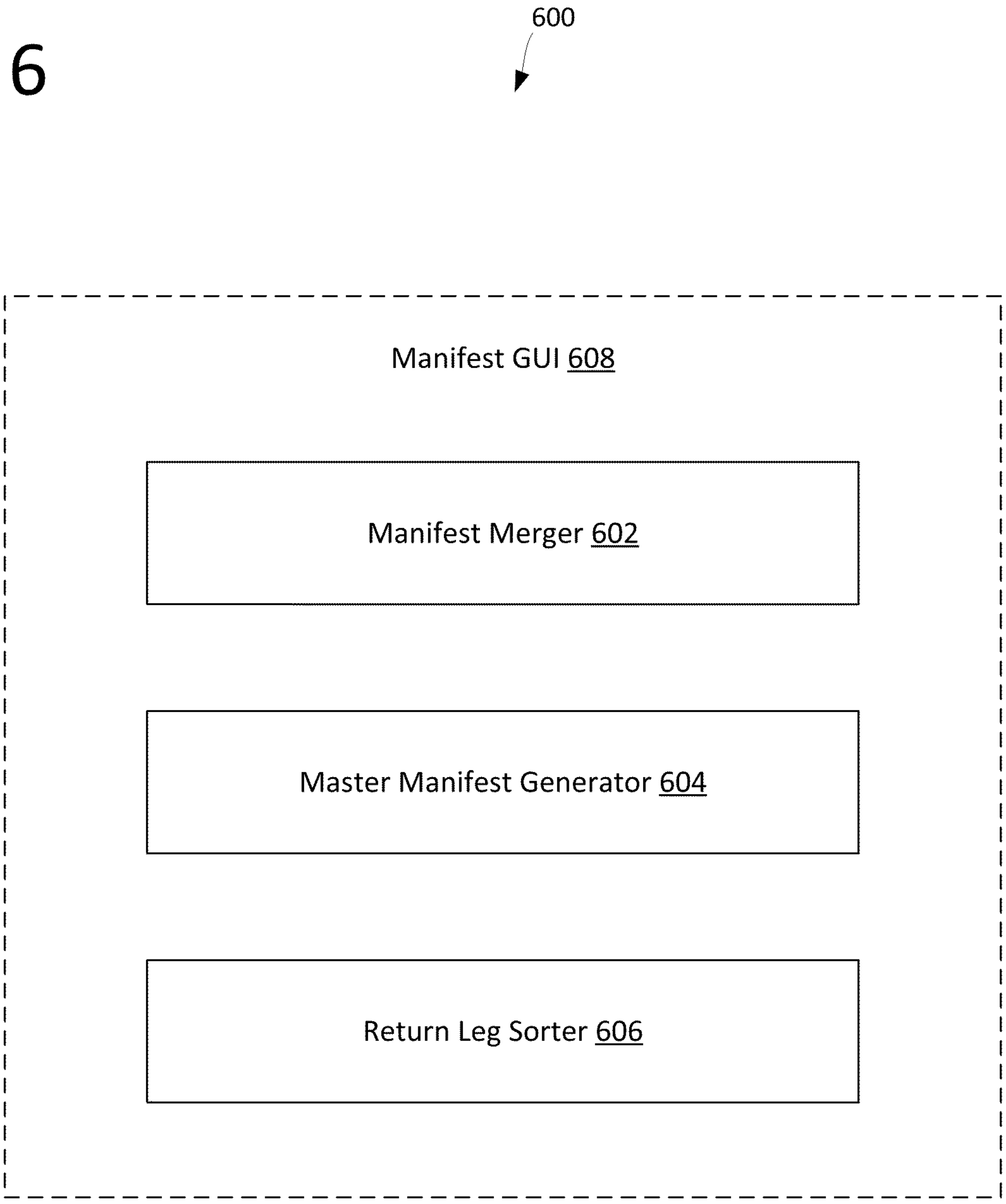
FIG. 6 illustrates a block diagram of programming modules for generating a master manifest in accordance with one embodiment.

FIG. 6 illustrates a block diagram of programming modules 600 for generating a master manifest in accordance with one embodiment. The programming modules 600 may communicate with a plurality of computing devices having programming modules 400 being executed thereon. The programming modules 600 may be stored by a computing device associated with the travel information system 128 or other travel management system. In some embodiments, one or more of the programming modules 600 may be stored on the server 148 and a computing device associated with the travel information system 128.

In some embodiments, the server 148 and the travel information system 128 may be integrated into the same computing system. In other embodiments, the server 148 may be integrated into the travel information system 108 or 110.

The programming modules 600 may include a manifest merger 602, a master manifest generator 604, and a return leg sorter 606. The one or more programming modules 600 may include software, hardware, firmware, or a combination of software, hardware, and firmware. The computing device associated with the travel information system 128 may include at least one processor and/or hardware to execute instructions of the one or more programming modules 600.

The programming modules 600 include a manifest graphical user interface (GUI) 608 that may include a manifest merger 602 to merge passenger manifest files from a plurality of computing devices 122, servers 148, or systems 100 for a current voyage. For example, the computing device associated with the travel information system 128 may be in communication with a plurality of systems 100, and each system 100 may have a plurality of computing devices 122. The passenger manifest files include a plurality of passenger manifest records created by the passenger manifest record generator 414 and the return leg manifest generator 416 populated with information accessed from the PNR 112.

It should be understood for the disclosure herein that there may be a plurality of local destination points, each serviced by a different system 100. For example, the destination point 107 may be at a local train station that is local to the port of the lodging entity 126. The destination point 107 may be at a local bus station that is local to the port of the lodging entity 126. The destination point 107 may be at each local airport that is local to the port of the lodging entity 126. The term "local" means a travel distance of less than 5-20 miles, 20-50 miles, or 51-100 miles from the lodging entity 126, for example. For example, a lodging entity may be docked at a port in a state with multiple airports, multiple train stations, multiple bus stations, etc., any of which may be used by a passenger to arrive as close as possible to the port based on the passenger's own point of origination and travel costs.

The manifest GUI 608 may interface with a master manifest generator 604 and a return leg sorter 606. The master manifest generator 604 may merge those files received from the one or more systems 100 and a manifest of booked passengers stored by the travel information system 128 into a master manifest file populated with information derived from a digitized O-BTI. The master manifest file is populated with accessed information of the PNR 112 related to the return leg of travel for those passengers with their BT 142 scanned and processed by system 100.

For example, at a cruise ship port, some passengers arrive the same day as the embarkation of the cruise ship. In other examples, passengers may arrive one or more days prior to embarkation. Still further, the PNR 112 of a passenger embarking on the same cruise voyage may be merged into a master manifest file. By way of non-limiting example, a third-party service provider may manage the luggage for a plurality of cruise ships at a port.

Each cruise ship will have its own master manifest file. The populated manifest passenger record based on information in the PNR 112 may be displayed on a display device using the manifest GUI 608. The manifest GUI 608 is a computer program that enables a user to see the passenger information records and their return leg flight information, for example. The passenger record may also include a passenger's cabin number on the current voyage. The return leg flight information may include, without limitation, one or more of the travel carrier information, the travel carrier geolocation, the flight number, the flight departure time, and the flight arrival time.

The master manifest generator 604 may display the generated master manifest file using the manifest GUI 608. The manifest GUI 608 may also include a return leg sorter 606 that enables personnel to sort the manifest by data associated with a return flight or return leg mode of travel that meets a check-in window for a return leg of travel.

While not wishing to be bound by theory, accessing data of PNR 112 based on a digital recreation of a 10-digit license plate to automate a process to populate a manifest and/or check-in of a passenger for a return leg of travel using the accessed data saves valuable human resources of the cruise ship and resources of a return travel carrier.

The processor(s) may sort a master manifest file with information associated with the passenger manifest record using a graphical user interface (GUI) of manifest GUI 608, such as sorting by the return leg flight times or other indicated times. The processor(s) may perform a check-in process for the return leg with the designated return travel carrier of each passenger based on the sorted master manifest file. In some embodiments, the master manifest file is for a resort destination that can include at least one hotel.

Figure 7:
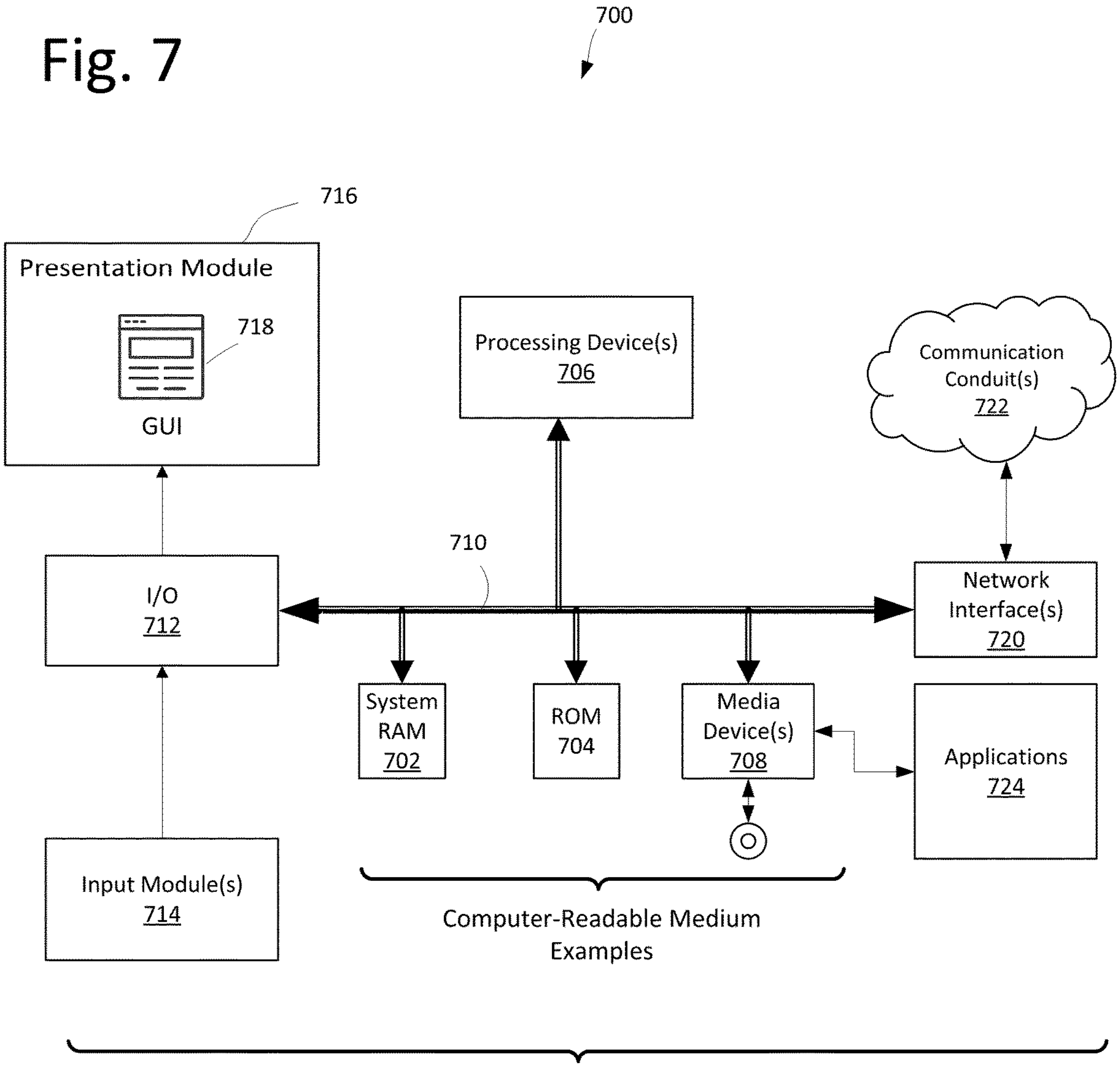
FIG. 7 illustrates a computing system in accordance with one embodiment.
Figure 7:
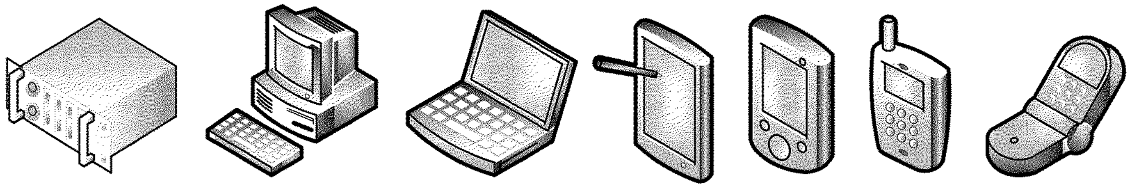

Referring now to FIG. 7, in a basic configuration, a computing device 700 (i.e., the computing device 122 or a local computing device) may include any type of stationary computing device, the server 148, a personal computer (PC), or a mobile computing device.

The computing device 700 may include one or more processing devices 706 and a system memory in a hard drive. Depending on the exact configuration and type of computing device 700, the system memory may be volatile (such as random-access memory (RAM 702)), non-volatile (such as read-only memory (ROM 704), flash memory, and the like), or some combination of the two. A system memory may store an operating system and one or more applications 724, and may include program data for performing at least one of the programming modules 400, described above in relation to FIG. 4, and the programming modules 600, described above in relation to FIG. 6.

The computing device 700 may carry out one or more blocks of a method 500 in FIG. 5 described herein, via the applications 724. The computing device 700 may also have additional features or functionality. As a non-limiting example, the computing device 700 may also include additional data storage media devices 708 (removable and/or non-removable) such as, for example, magnetic disks, optical disks, or tape. The computer storage media devices 708 may include volatile and non-volatile, non-transitory, removable, and non-removable media implemented in any method or technology for storage of data, such as computer readable instructions, data structures, program modules, or other data. The system memory, removable storage, and non-removable storage are all non-limiting examples of computer storage media. The computer storage media may include, but is not limited to, the RAM 702, the ROM 704, Electrically Erasable Programmable Read-Only Memory (EEPROM), flash memory or other memory technology, compact disc read-only memory (CD-ROM), digital versatile discs (DVD) or other optical storage, magnetic cassettes, magnetic tape, magnetic disc storage or other magnetic storage devices, or any other physical medium which can be used to store the desired data and which can be accessed by the computing device 700. Any such computer storage media may be part of the computing device 700.

The computing device 700 may also include or have input/output (I/O) interfaces 712 for one or more input modules 714, such as a keyboard, mouse, pen, voice input device, touch input device, etc. The input module(s) 714 may include a video device, an imaging device 118, and/or a scanner 116, as shown in FIG. 1. The computing device may include or have I/O interfaces 712 for connection to an output device(s) such as a display, a presentation module 716, speakers, etc. A graphical user interface (GUI) 718 may be displayed on the presentation module 716. The computing device 700 may include a peripheral bus 710 for connecting to peripherals. The computing device 700 may contain a communication connection(s) that allows the device to communicate with other computing devices, such as over a network or a wireless network.

By way of example, and not limitation, a communication connection(s) may include wired media such as a wired network or direct-wired connection, and wireless media such as acoustic, radio frequency (RF), infrared, and other wireless media. The computing device 700 may include a network interface(s) 720, such as a network interface card to connect (through a wired or wireless connection) to a network or other communication conduit(s) 722.

A computer program code for carrying out the operations described above may be written in a variety of programming languages, including but not limited to a high-level programming language, such as C or C++, Python, or Java, based on development convenience. In addition, a computer program code for carrying out operations of embodiments described herein may also be written in other programming languages, such as, but not limited to, interpreted languages. Some modules or routines may be written in an assembly language or even micro-code to enhance performance and/or memory usage. It will be further appreciated that the functionality of any or all of the program modules may also be implemented using discrete hardware components, one or more application specific integrated circuits (ASICs), a programmed Digital Signal Processor (DSP), or a microcontroller. A code in which a program of the embodiments is described can be included as a firmware in a RAM, a ROM, and a flash memory. Otherwise, the code can be stored in a tangible computer-readable storage medium such as a magnetic tape, a flexible disc, a hard disc, a compact disc, a photo-magnetic disc, and a digital versatile disc (DVD).

The embodiments may be configured for use in a computer or a data processing apparatus which includes a memory, such as a central processing unit (CPU), a RAM, and a ROM, as well as a storage medium, such as a hard disc.

Figure 8:
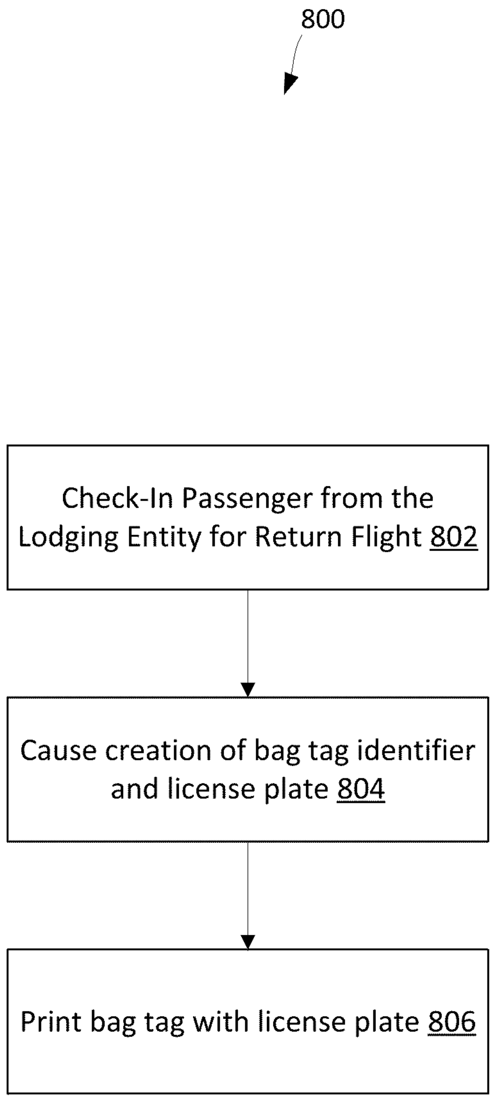
FIG. 8 illustrates a flow chart of a method for checking-in a passenger leaving a lodging entity in accordance with one embodiment.

FIG. 8 illustrates a flow chart of a method 800 for checking in a passenger leaving a lodging entity in accordance with one embodiment. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence. According to some examples, the method 800 includes checking in a passenger from the lodging entity for a return flight, at block 802. If the first-mode travel carrier is an airline, then the method 800 may determine if the check-in window is open. For example, a passenger for a flight may be allowed to be checked in within 24 hours to 48 hours of departure of a return flight. Train carriers may have a different window.

According to some examples, the method 800 includes causing creation of a bag tag identifier and an IATA license plate, at block 804. According to some examples, the method 800 includes printing a bag tag with a license plate, at block 806. When a passenger is checked in, such as for a flight, one or more IATA B-type messages are generated that include inbound and outbound flight numbers and dates, baggage details such as the 10-digit bag tag identifier, a passenger name, and PNR information.

The process for checking in a passenger on a return flight may include electronically communicating a boarding pass to the passenger, such as to a passenger's mobile phone or computing device. The communication may include an email of the boarding pass for the return flight. The communication may include a text message of the boarding pass for the return flight.

In some embodiments, the communication may include information associated with the 10-digit bag tag identifier so that upon return of their final leg of travel, the passenger can find and track their baggage using an IATA 10-digit bag tag identifier or the like.

Various remote check-in processes are known. For example, U.S. Pat. No. 11,348,040, titled "INTEGRATED END-TO-END TRAVEL INSTRUMENT (TI) DEVICE GENERATION SYSTEM AND INTEGRATED INSTRUMENT DEVICES" is incorporated herein by reference. US2010/0211418 titled "BAGGAGE TAGGING SYSTEM AND METHOD HAVING DATA FROM MULTIPLE SOURCES," is incorporated herein by reference.

The method 800 may include, during the remote check-in process, obtaining, by the at least one processor, airline bag tag information for the return leg of travel for checked in luggage items for the passenger; and printing, by a printer, a new bag tag for the return leg of travel that is compatible with an International Air Transport Association (IATA) license plate for each checked in luggage item of the passenger.

The method 800 may include replacing the printed bag tag from the first-mode travel carrier with the new bag tag for the return leg of travel.

The method 800 may include, during the remote check-in process, obtaining, by the at least one processor, boarding pass information for the return leg of travel of the passenger; and communicating, by the at least one processor, the boarding pass information to an electronic communication device of the passenger.

The boarding pass information may include bar coded boarding pass information. The boarding pass information may be in an e-ticketing format.

Figure 9:
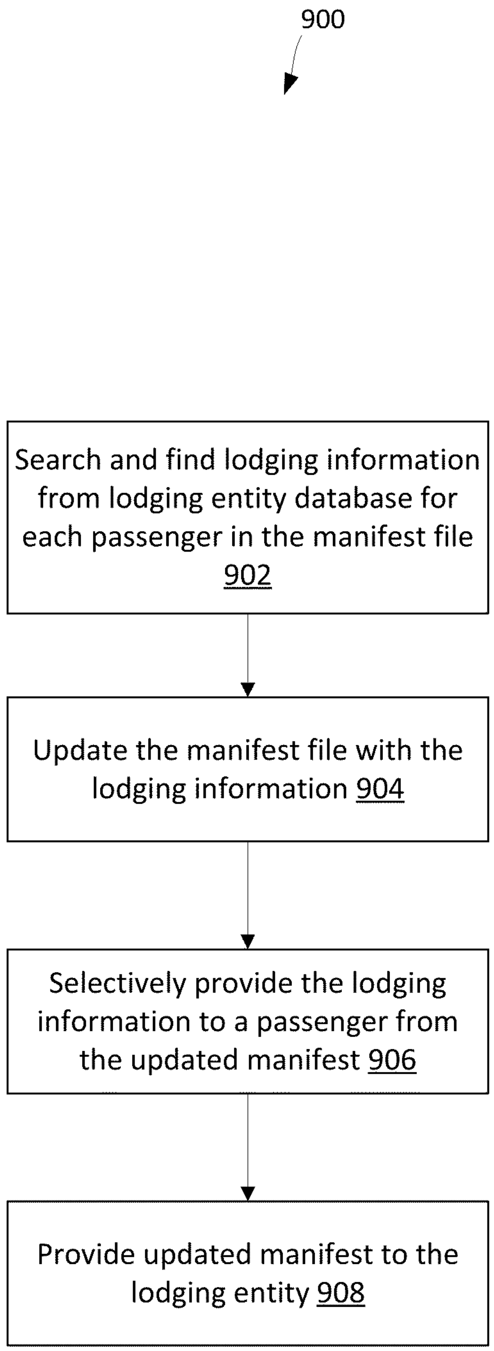
FIG. 9 illustrates a flow chart of a method for merging passenger manifest and lodging entity information in accordance with one embodiment.

FIG. 9 illustrates a flow chart of a method 900 for merging passenger manifest and lodging entity information in accordance with one embodiment. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. According to some examples, the method 900 may include searching and finding lodging information from a lodging entity database for each passenger in the manifest file, at block 902. By way of a non-limiting example, the lodging entity database may include a passenger room, suite, or cabin number.

According to some examples, the method 900 may include updating the manifest file with the lodging information, at block 904. According to some examples, the method 900 may include selectively providing the lodging information to a passenger from the updated manifest, at block 906. According to some examples, the method 900 may include providing an updated manifest to the lodging entity, at block 908. The updated manifest includes the lodging information from the lodging entity and the passenger information, such as a passenger name, return flight information for at least a first-mode travel carrier, and an original bag tag ID.

The identifying data to check-in for the return leg of travel may include at least return leg flight times and airline carriers. The method may include sorting, by the at least one processor, the master manifest file by information associated with the return leg flight times for the plurality of passengers; and executing, by the at least one processor, a remote check-in process for the return leg of travel with the designated return travel carrier of each passenger based on the sorted master manifest file.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/ steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having meanings that are consistent with their meanings in the context of the relevant art and will not be interpreted in idealized or overly formal senses unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission, or display devices.

"Communication media" typically comprise computer readable instructions, data structures, program modules, or other data in a modulated data signal, such as a carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprise wired media such as a wired network or direct-wired connection, and wireless media such as acoustic, infrared, and other wireless media. Combinations of any of the above are also included within the scope of a computer readable medium.

Alternatively, or in addition, any of the functions and programming modules described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products, System-on-a-chip systems, Complex Programmable Logic Devices, and the like.

The terms "module" and "component" as used herein generally represent software, firmware, hardware, or combinations thereof. In the case of a software implementation, the module or component represents a program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., a set-top box, desktop, laptop, notebook, tablet computer, personal digital assistant (PDA), mobile telephone, smart telephone, gaming console, wearable device, an Internet-of-Things (IOT) device, and the like).

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions, and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers, and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random-access memory (RAM); magnetic disk storage media; optical storage media; flash memory devices; electrical, optical, acoustical, or other forms of propagated signals (e.g., carrier waves, infrared signals, digital signals, etc.), and others.

Further, firmware, software, routines, and instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disc, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premises or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disc, or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C #, C++, Visual Basic, or the like and conventional procedural programming languages, such as the "C" programming language or similar programming languages. Additional languages may include scripting languages such as PYTHON, LUA, and PERL.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

BTI means "bag tag identifier." A bag tag identifier, also known as a baggage tag or baggage label, is a small tag or label attached to a passenger's luggage that contains identifying information about the passenger and their flight. It is used by airlines to track and handle the passenger's checked baggage. The tag usually includes the passenger's name, flight information (the flight number, the departure and destination airports, and the date of travel), and a unique identifier, such as a bag tag number or barcode. The bag tag identifier number is unique for each luggage and is used as a reference for the airlines to track the luggage through the baggage handling system, matching the luggage to the passenger's flight and route, and also to identify the owner of the luggage in case of misplaced, lost, or delayed luggage. The bag tag identifier is usually issued at check-in, and the passenger attaches it to their luggage before they drop the luggage off at the baggage drop-off counter.

First-mode travel carrier (FMTC) means the initial carrier that affixes a tangible, machine-scannable indicium to a passenger's luggage which according to the present invention is used to retrieve the passenger PNR and then construct a passenger manifest for one or more return trips without having to manually reenter data.

International Air Transport Association (IATA) refers to the world-wide trade association of airlines (for both freight and passenger carriers) that regulates the aviation industry by promulgating standards, procedures, and practices.

License Plate means the ten-digit numeric code on a bag tag issued by a carrier to agent during check-in for a travel journey. The term "license plate" in this context is the official term used by IATA. The license plate is encoded in a machine-scannable bar code but also presented in human-readable form where it will have either a two-character or a three-digit IATA carrier code. For example, it may be either "CZ728359" or "784728359." "CZ" would be the two-character IATA code for China Southern Airlines, and "784" would be the three-digit IATA carrier code. For American Airlines, the IATA Designator would be "AA" and the IATA code would be "001."

Lodging Entity means a business or operation providing residential hospitality services, such as a hotel, resort, or cruise ship as non-limiting examples.

Passenger Manifest means a record containing an array of data including data for check-in of a return leg of travel of a passenger with a designated return travel carrier.

PNR stands for "Passenger Name Record." It is a record in the database of an airline or a travel agency that contains all the details of a passenger's itinerary and trip information. This information includes the passenger's name, contact information, flight details, seat preferences, and any special requests. The PNR also contains information about the booking, such as the booking date, fare, and ticketing status. It is used by the airlines and travel agencies to manage and keep track of the passenger's itinerary and travel plans. The PNR number is unique for each passenger and is used as reference for the passengers, airlines, and travel agencies. The PNR is also used to check-in, check flight status, and make any changes to the reservation. The PNR number itself is typically 6 characters, often including a combination of letters and numbers. While regulatory bodies like IATA (see above) do not dictate a universal format for PNRs, each PNR has five (5) mandatory fields including: (1) the phone number for a traveler or agent; (2) the last person who made changes in the PNR; (3) the itinerary which must include at least one segment of the journey; (4) the name of the passenger or passengers including full first and last names; and (5) specifications on how and when a ticket is to be issued.

Radio-frequency identification (RFID) means a technology that uses electromagnetic fields to automatically identify and track tags attached to objects.

Return travel carrier (RTC) means the carrier (e.g., an airline) a passenger takes at the conclusion of a stay at a lodging entity. The RTC in the present invention is extracted in a process using the license plate printed by the FMTC to access the PNR of the passenger to build a passenger manifest for the return journey. Among other benefits, this reduces or eliminates data entry, particularly for the lodging entity checking in the passenger for the RTC.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computing system for optimizing luggage handling, comprising:

a printing device;

at least one processor;

memory containing computer readable instructions that are accessible by the at least one processor, wherein the computer readable instructions are configured to cause the at least one processor to:

acquire, with one of an optical scanning device or a radio frequency communication device, an electronic representation of an originating bag tag identifier (O-BTI) associated with a luggage item of a passenger;

locate and access information of a manifest record of the passenger based on information contained in the O-BTI; and transmit print instructions to the printing device for printing a return bag tag identifier based on the information of the manifest record of the passenger, the return bag identifier being formatted according to the International Air Transport Association (IATA) standard.

2. The computing system of claim 1, wherein the manifest record is created and stored on an external travel carrier system and the computing system is granted permission to access the external travel carrier system including the manifest record of the passenger.

3. The computing system of claim 1, wherein the O-BTI is initially generated by an external travel carrier system and contains information accessible by the computing system.

4. The computing system of claim 3, wherein the external travel carrier system is operated by an airline, and the airline generated the O-BTI for tracking the luggage item of the passenger for a first leg of travel.

5. The computing system of claim 1, further comprising: a barcode scanner in communication with the at least one processor, wherein the at least one processor is configured to acquire the electronic representation of the O-BTI via the barcode scanner.

6. The computing system of claim 1, wherein the at least one processor is further configured to transmit a check in request, on behalf of the passenger, to a return flight carrier, and wherein the check in request comprises passenger information corresponding to the return bag tag information.

7. The computing system of claim 1, wherein the at least one processor is further configured to: obtain boarding pass information for the return flight of the passenger from an external travel carrier system; and transmit the boarding pass information to a device of the passenger.

8. The computing system of claim 1, wherein the at least one processor is further configured to: create, by the printing device, a marker identifier linking the manifest record to the luggage item; and transmit marker identifier information to populate the manifest record with the marker identifier information.

9. The computing system of claim 8, wherein the marker identifier comprises a barcode, readable by a barcode scanning device, and wherein the marker identifier includes the O-BTI or a new passenger tracking identifier.

10. A computing system for optimizing luggage handling, comprising:

a printing device;

an electronic acquiring device, wherein the electronic acquiring device is one of: an optical scanning device or a radio frequency communication device;

at least one processor; and memory containing computer readable instructions that are accessible by the at least one processor, the computer readable instructions are configured to cause the at least one processor to:

acquire, by the electronic acquiring device, an IATA license plate from an indicium affixed to a luggage item of a passenger, the IATA license plate being generated by a travel carrier;

obtain information in a manifest record of the passenger, the manifest record located using the IATA license plate acquired from the indicium; and print, by the printing device, a return leg travel IATA formatted bag tag for a return flight based on information in the manifest record.

11. The computing system of claim 10, wherein the indicium is printed on an originating paper bag tag, and the travel carrier is an airline, and wherein an external third-party computer system associated with the airline generated the IATA license plate that was acquired by the electronic acquiring device.

12. The computing system of claim 10, wherein the indicium is printed an airline baggage marker, and the travel carrier is an airline.

13. The computing system of claim 10, further comprising at least one barcode scanner, and wherein the at least one processor is configured to acquire the IATA license plate via the barcode scanner from a printed tag attached to the luggage item or a printed marker adhered to the luggage item.

14. The computing system of claim 10, wherein the at least one processor is further configured to transmit a request on behalf of the passenger with a return flight carrier including passenger information for the return bag tag information.

15. The computing system of claim 14, wherein the at least one processor is further configured to: obtain boarding pass information for the return flight of the passenger from an external system associated with the return flight carrier; and transmit the boarding pass information to a device of the passenger.

16. The computing system according to claim 10, wherein the at least one processor is further configured to: create, by the printing device, a marker identifier linking the manifest record to the luggage item if the O-BTI appears damaged or is missing; and populate the manifest record with the marker identifier.

17. The computing system of claim 16, wherein the electronic acquiring device is a barcode scanning device and the marker identifier comprises a barcode readable by the barcode scanning device, and wherein the marker identifier includes the O-BTI or a new passenger tracking identifier.

18. The computing system of claim 17, wherein the electronic acquiring device is an RFID reader and the marker identifier is associated with an RFID enabled bag tag, and wherein the marker identifier includes the O-BTI or a new passenger tracking identifier.

19. A computing system for optimizing luggage handling, comprising:

a communication device;

a printing device;

an electronic acquiring device, wherein the electronic acquiring device is one of: an optical scanning device or a radio frequency communication device;

at least one processor; and memory containing computer readable instructions that are accessible by the at least one processor, the computer readable instructions are configured to cause the at least one processor to:

acquire, by the electronic acquiring device, passenger data from an indicium affixed to a luggage item of a passenger, the passenger data including information contained in an originating bag tag identifier (O-BTI);

obtain, by the communication device, information from a manifest record associated with the passenger based on the passenger data acquired from the indicium; and print, by the printing device, a return leg travel International Air Transport Association (IATA) formatted bag tag for a return flight for the passenger from information in the manifest record.

20. The computing system of claim 19, wherein the indicium is printed on an originating paper bag tag, and the travel carrier is an airline, wherein an external third-party computer system associated with the airline generated the O-BTI acquired from the originating paper bag tag.

21. The computing system claim 19, wherein the indicium is printed on an airline baggage marker, and the travel carrier is an airline, wherein a computer system associated with the airline generated the O-BTI acquired from the airline baggage marker.

22. The computing system of claim 19, wherein the at least one processor is further configured to: transmit, via the communication device, a check in request on behalf of the passenger with a return flight carrier including passenger information for bag tag information for the return leg travel IATA formatted bag tag.

23. The computing system of claim 22, wherein the at least one processor is further configured to: obtain, via the communication device, boarding pass information for the return flight of the passenger from an external system associated with the return flight carrier; and transmit, via the communication device, the boarding pass information to a device of the passenger.

24. The computing system of claim 19, further comprising: printing, by the printing device, a marker identifier based on the manifest record of the passenger, the marker identifier including printed information contained in the originating bag tag identifier (O-BTI); and populating the manifest record with the marker identifier.

25. The computing system of claim 24, wherein the electronic acquiring device comprises a barcode scanning device, and wherein the marker identifier comprises a barcode.

26. The computing system of claim 25, wherein the barcode comprises a new passenger tracking identifier.

27. A computing system for optimizing luggage handling, comprising:

a communication device;

an electronic acquiring device, wherein the electronic acquiring device is one of: an optical scanning device or a radio frequency communication device;

at least one processor; and memory containing computer readable instructions that are accessible by the at least one processor, the computer readable instructions are configured to cause the at least one processor to:

acquire, by the electronic acquiring device, passenger data from an indicium affixed to a luggage item of a passenger, the passenger data including information contained in an originating bag tag identifier (O-BTI);

obtain, by the communication device, information from a manifest record of the passenger based on the passenger data acquired from the indicium;

create a digital recreation of the indicium based on the manifest record and the passenger data; and transmit, via the communication device, the digital recreation of the indicium to a mobile device of the passenger.

28. The computing system of claim 27, wherein the digital recreation of the indicium contains information suitable for tracking the luggage of the passenger during a return leg travel trip.

29. The computing system of claim 27, further comprising: a printing device; wherein the at least one processor is further configured to: print, by the printing device, a new bag tag based on the digital recreation of the indicium.

30. The computing system of claim 29, wherein the new bag tag is suitable for checking the luggage in for a return leg travel and is formatted according to International Air Transport Association (IATA) criteria.

31. The computing system of claim 30, wherein the digital recreation of the indicium contains information suitable for tracking the luggage of the passenger during the return leg travel trip.

* * * * *